Aug. 15, 1939. H. J. LEISNER 2,169,467
WORK CENTERING AND SUPPORTING MEANS FOR MILLING MACHINES
Filed Jan. 16, 1939 3 Sheets-Sheet 1

INVENTOR
Henry J. Leisner.
BY
ATTORNEY

WITNESS

Aug. 15, 1939  H. J. LEISNER  2,169,467
WORK CENTERING AND SUPPORTING MEANS FOR MILLING MACHINES
Filed Jan. 16, 1939  3 Sheets-Sheet 2

INVENTOR
Henry J. Leisner.
BY
ATTORNEY

WITNESS

Aug. 15, 1939.     H. J. LEISNER     2,169,467
WORK CENTERING AND SUPPORTING MEANS FOR MILLING MACHINES
Filed Jan. 16, 1939     3 Sheets-Sheet 3

INVENTOR
Henry J. Leisner.

WITNESS
BY
ATTORNEY

Patented Aug. 15, 1939

2,169,467

UNITED STATES PATENT OFFICE 2,169,467

WORK CENTERING AND SUPPORTING MEANS FOR MILLING MACHINES

Henry J. Leisner, Philadelphia, Pa., assignor to The Hall Planetary Company, Philadelphia, Pa., a corporation of Pennsylvania Application January 16, 1939, Serial No. 251,171

11 Claims. (Cl. 10—154)

This invention relates to milling machines of the type generally disclosed in United States Letters Patent 1,316,718, 1,507,235 and 2,081,275, respectively granted to Peter P-G. Hall on September 23, 1919, September 2, 1924, and May 25, 1937, its principal object being to provide means for supporting that end of a work piece of relatively small diameter adjacent which the milling operation is to be performed and which is therefore necessarily more or less remote from the point at which the piece is chucked or otherwise stationarily supported during that operation.

In machines of this general type the work, whatever be its character, is held stationary and the milling cutter while rotating on its own axis is moved about the work in a planetary orbit after having been brought to the requisite depth therein. The machines are designed, moreover, to produce an entire worm, thread or the like or to "form mill" a certain zone on the work piece during a single orbital movement of the cutter about the latter, and the cutter, whatever be its specific type, therefore has to be of sufficient length axially to produce this result. The work is fixedly supported in a chuck or other suitable holding device, and while it is possible to design these holding devices so they can be brought very close to the adjacent extremity of the cutter, nevertheless the work piece has to extend sufficiently beyond the holding device to expose a little more of it than the zone which is to be milled. When the work piece is inherently relatively stiff and unyielding, it does not appreciably give under the action of the cutter when chucked in this manner but when it is of relatively thin section and especially when the amount which it overhangs the chuck is relatively considerable, it tends to yield slightly under the action of the cutter which results in diminution of the accuracy and finish of the milled piece.

While the desirability of affording support to the inner overhanging ends of work pieces of this general class has therefore been recognized, no satisfactory means so far as I am aware has hitherto been proposed for the purpose since, among other things, the movement of the cutter about the work, and when cutting threads or worms its movement longitudinally and sometimes radially thereof as well, must be reckoned with, and the supporting device for the inner end of the work consequently so arranged and constructed as to be at all times out of the way of the cutter to enable the latter to perform its function in the normal way.

These considerations have rendered the problem a very difficult one which, prior to my invention, has remained unsolved but which through the medium thereof is satisfactorily and effectively resolved as will hereinafter more fully appear as the description of the invention proceeds.

In general the movement of the cutter in machines of the character to which the invention relates including that of moving it in to depth at the initiation of its operation upon the work piece and that of moving it out of depth following the completion of its cut, are controlled by the operation of a cylindrical main container rotatably supported in the machine frame and adapted for limited longitudinal movement therein concurrently with its rotation when such movement is required by the nature of the work, a secondary container rotatable in the main container about an axis offset from that of the latter and a cutter spindle supporting the cutter and journaled for rotation in the secondary container on an axis eccentric with respect to both container axes. The cutter may be of any type adapted for the performance of desired operation upon the work piece which latter is stationarily supported in a chuck or other holding device in such manner that the portion of the piece which is to be milled is substantially aligned with the cutter transversely of the machine, that is, in a plane normal to the cutter axis. The work piece having been chucked in this position, the operating cycle is initiated by causing the cutter spindle to rotate about its own axis so as to drive the cutter, the secondary container is then turned in the main container so as to cause the cutter to approach the work in a generally radial direction until the proper depth of cut is obtained therein and the main and secondary containers are then rotated as a unit so as to carry the cutter in an orbital path about the work for slightly more than a single revolution, after which the cutter is returned to its initial position by turning the containers in reverse direction. The cutter is thus caused to operate upon the work in a definite zone corresponding in length to the effective length of the cutter blades or teeth and the surface of the milled zone conforms to the shape of the cutter blades after the milling operation is completed. This is known as "form milling." When, however, a thread or worm is to be cut on the work, the main container carrying with it the secondary container, cutter spindle and cutter, is given additionally a gradual longitudinal movement of progression, corresponding to the desired pitch of the thread or worm, while the cutter is moving about the work, the cutter teeth of course being without pitch, and if a taper thread is being cut, the cutter is simultaneously moved very gradually radially of the work, all as is well understood by those familiar with the aforesaid machines.

It is therefore apparent that the work must extend or overhang beyond the chuck sufficiently to bring that portion thereof which is to be operated on by the cutter into substantial transverse alignment with the latter, and as the major portion of the pressure exerted by the cutter on the work is in a generally radial direction, the work tends to bend or yield radially in an amount determined largely by the area of its cross section, the length of overhang from the chuck and the depth of cut and consequent pressure exerted on it by the cutter as well as other factors such as the strength of the material and the like, and, of course, the greater the deflection of the work whatever be its cause, the greater is the inaccuracy of the finished product.

Therefore, as hitherto generally stated, it is a principal object of my invention to provide in a machine of the general character to which I have referred, means for centering and supporting that end of the work remote from the point at which it is chucked during the operating cycle of the machine so as to prevent its deflection and/or chattering while the cutter is operating upon it without, however, interfering in any way with the normal operation of the cutter.

Other objects, advantages and novel features of design, construction and arrangement comprehended by the invention are hereafter more particularly pointed out or will be apparent as the description thereof proceeds.

In the accompanying drawings I have illustrated certain embodiments of the invention together with as much of a typical "Planetary" milling machine as is requisite for adequate comprehension of its salient features, but it will be understood that if desired cutters and work holding devices other than those of the type illustrated may be utilized with equal facility and that numerous changes and modifications may be made in the design, construction and arrangement of the various instrumentalities more particularly concerned with the work centering and supporting means of my invention in accordance with the character of the work piece and the nature of the work to be performed thereon as will be readily appreciated by those skilled in the art.

More specifically, in the said drawings

In the several figures like characters are used to designate the same parts.

Figure 1:
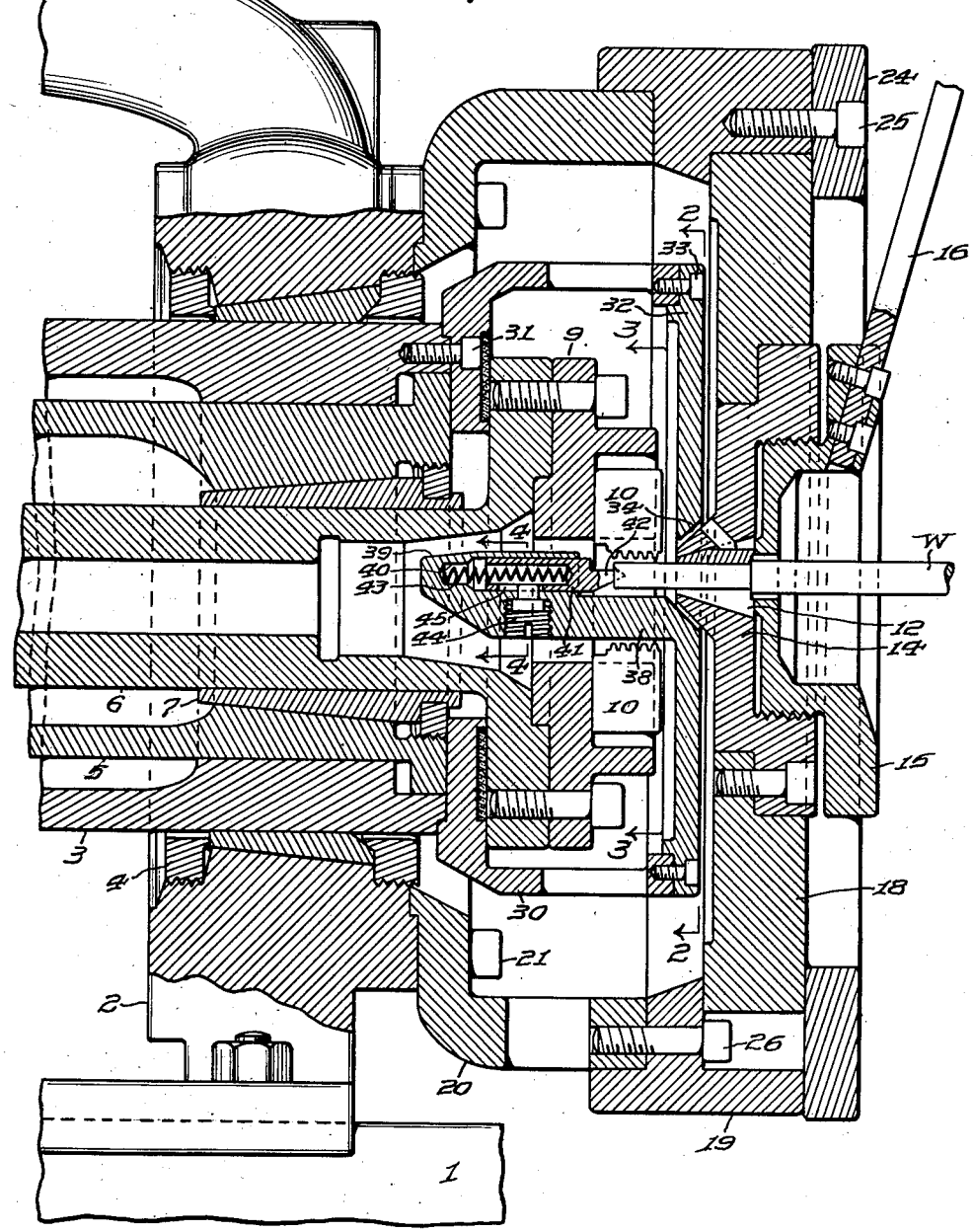
Fig. 1 is a vertical section of a preferred embodiment of the invention in operative association and combination with a Hall "Planetary" milling machine (fragmentarily shown) in which the work supporting chuck is carried by the frame in which the containers are journaled and the work centering and supporting means by the main container.
Figure 2:
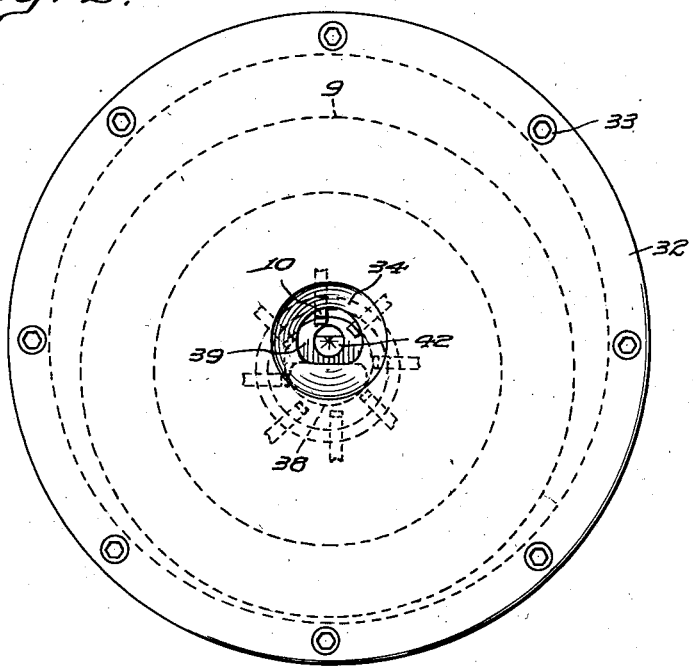
Fig. 2 is a front elevation of the center supporting mechanism on the line 2—2 in Fig. 1, the chuck and work supported thereby having been removed.
Figure 3:
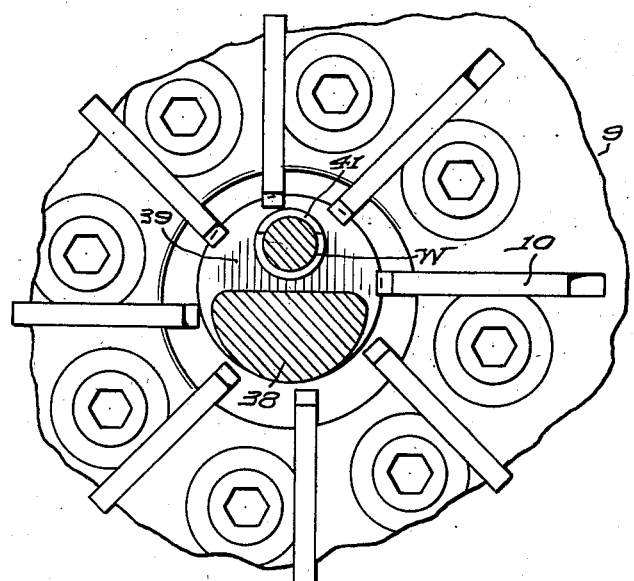
Fig. 3 is a fragmentary enlarged section on the line 3—3 in Fig. 1.
Figure 4:
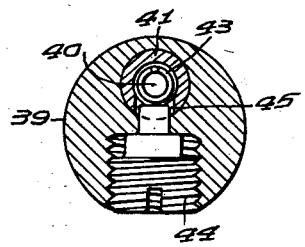
Fig. 4 is a fragmentary enlarged section on the line 4—4 in Fig. 1.

Referring now more particularly to the drawings, the milling machine to which reference has been made comprises, as shown in Fig. 1, a base 1 supporting frame 2 in which the main container 3 is carried on preferably adjustable bearings 4 and adapted for rotative as well as limited longitudinal movement therein. The secondary container 5 rotatable in the main container about an axis eccentric to that of the latter supports in turn the cutter spindle 6 which is eccentrically located with relation to the secondary container axis and is rotatable in bearings 7. A cutter of any suitable type is mounted on the end of the cutter spindle, the particular cutter shown, which is adapted for forming a worm on the work, comprising a head 9 with inserted cutter blades 10 uniformly spaced circumferentially about the head and having substantially radially inwardly directed cutting teeth without pitch corresponding to the profile of the desired worm.

It will be understood that the remainder of the machine, omitted from Fig. 1, includes additional bearings and mechanism for effecting the requisite movements of the containers and cutter spindle to carry out the desired operations upon a work piece when properly supported in the path of the cutter blades.

The work supporting mechanism may also be of any type adapted for the performance of its intended function of stationarily holding the work in proper position, that which I have chosen to illustrate, which is designed for holding a relatively thin cylindrical work piece W, comprising essentially a tapered split collet 12 fitted in a tapered hole in a chuck plate 14 and operated through a threaded driver 15 adapted to bear against the end of the collet and force it into the tapered hole, thereby contracting its central bore about the work when the driver is set up by means of an operating lever 16 or the like after the work has been passed through the collet. The chuck plate 14 is supported in an annular plate 18 carried by a ring 19 on a housing 20 fitted to the end of the main frame 2 and secured in position thereon by cap screws 21, a locking ring 24 secured by cap screws 25 holding plate 18 in rigidly assembled relation on ring 19 and the latter being secured to housing 20 by screws 26. It will be understood that this specific description of the chuck is herein set forth for the purposes of illustration only and that any desired form of chuck may be employed, it being preferred, however, that one adapted to afford rigid support to a portion of the work as closely adjacent the operating zone of the cutter as possible be utilized.

For centering and supporting the inner extremity of the work piece in the form of the invention shown in Fig. 1 I provide in accordance with my invention an annular housing 30 carried on the end of the main container and suitably secured thereto as by cap screws 31; to the outer end of this housing a plate 32 is fitted and secured by screws 33, the plate having a central opening 34 preferably beveled at its edge to provide a clearance adjacent the nose of the chuck which projects partially into the opening while the work extends through and beyond the latter when in operating position. The plate carries an integral arm 38 of substantially semi-cylindrical cross section extending from its inner face through and beyond the zone of the orbit on the diametrically opposite side of the work from the portion thereof contacted by the cutter blades at any point during the operating cycle. The diameter of the free space in the cutter bounded by the inner extremities of the blades is preferably made considerably larger in proportion to the diameter of the work piece than is usual in similar cutters heretofore generally employed for this class of work in order to afford room for arm 38, and the path of the cutter teeth through the work piece is therefore along a relatively flat arc of considerably larger radius than the latter.

Arm 38 inwardly of the said orbital zone has an enlargement 39 providing a bore or seat 40 coaxial with the chuck and work piece and adapted to snugly receive a hardened center point 41 the pointed tip 42 of which is entered in an axial countersink in the end of the work piece when the latter is chucked and a compression spring 43 in the bore behind the center point maintains its tip 42 in supporting engagement with the work piece during the limited relative longitudinal movement of the main container required when threads or worms are being milled. A screw 44 extends through the arm into a slot 45 in the center point to limit its outward movement under influence of spring 43.

Thus after the work piece is inserted in the chuck with its end engaging center point 41 and chuck collet 12 is set up on the work by operation of lever 16, the operative cycle of the milling machine may be initiated to bring the cutter teeth in to depth by relative rotation of the secondary container in the main container to move the axis of the cutter spindle downwardly in Fig. 1 as the spindle rotates on its own axis. After the cutter has been brought in to depth, the main and secondary containers are rotated unitarily to carry the cutter axis rotatively about the axis of the work, at the same time rotating plate 32 and the mechanism supported therefrom, and as the main container and work are coaxial, arm 38 also moves about the axis of the work in circumferentially spaced relation to that portion thereof on which the cutter teeth are operating at any given moment. If, as with the cutter illustrated, the work is to have a spiral groove or worm cut in its periphery, the main container is gradually moved longitudinally during its rotation on its axis at a rate corresponding to the desired pitch in the worm but while plate 32 moves with it, the work is held stationary so center point 41 cannot move longitudinally and the resultant relative longitudinal movement of arm 38, resisted by spring 43, permits the requisite longitudinal movement of the cutter teeth with the main container without impairing the effectiveness of the center point to prevent deflection of the work piece under the pressure of the cutter teeth acting upon it. The center point of course is restored by the spring to its former position relatively to the arm when, after completion of the cut, the cutter moves out of depth and the main container returns to starting position through reverse movement preparatory to initiation of a succeeding operating cycle, screw 44 keeping the center point in bore 40 after the work piece has been removed and preferably thereby maintaining spring 43 under moderate compression.

Figure 5:
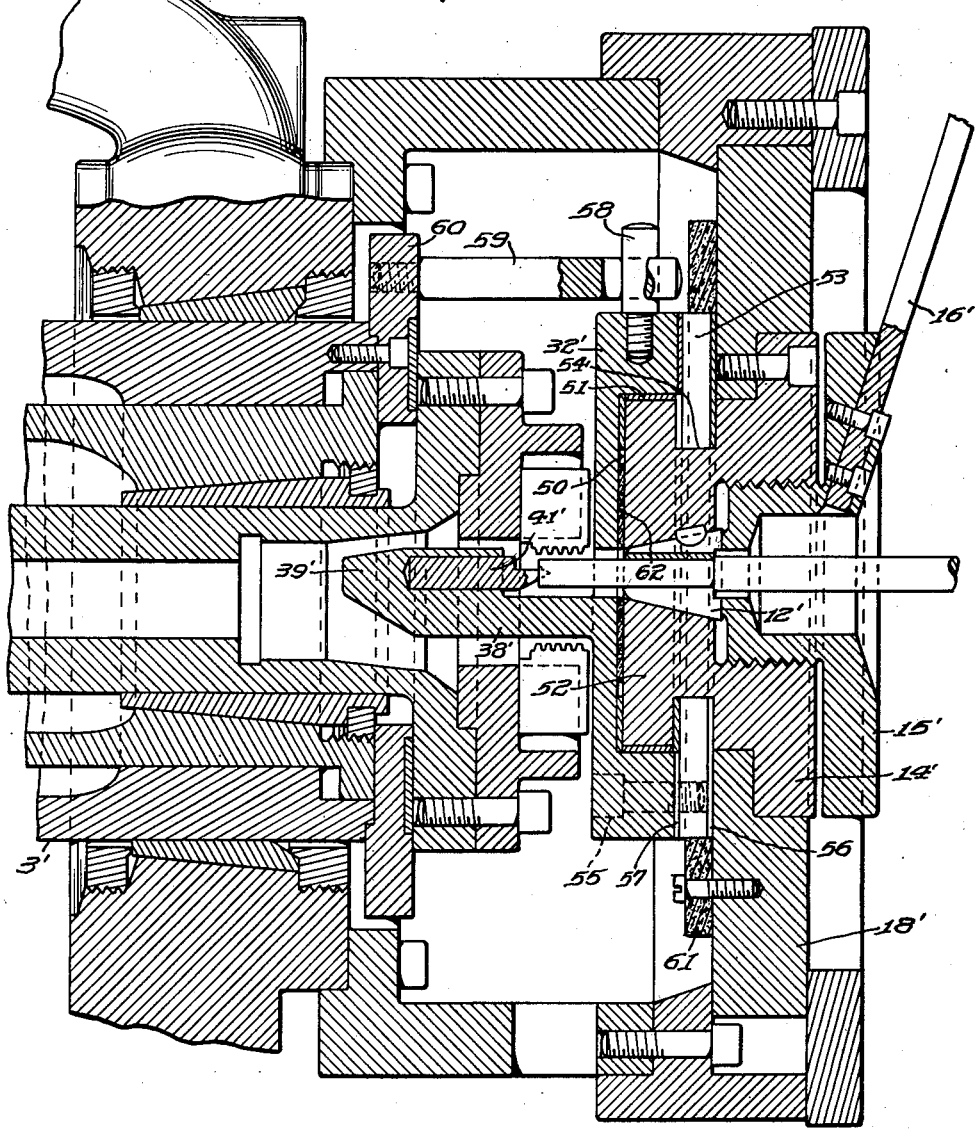
Fig. 5 is a view corresponding to Fig. 1 but showing a different embodiment of the invention in which the centering and work supporting means is carried by the chuck rather than by the main container.

The modified embodiment of the invention illustrated in Fig. 5 is generally similar in its structure and principles of operation save that its center point 41' is supported in an arm 38' carried by the chuck mechanism instead of by the main container so that no relative movement between point 41' and the arm is required to enable threads or the like to be formed in the work. Consequently this point may be made as a solid insert of hardened steel tightly fitted into the enlargement 39' of arm 38'. Plate 32' supporting arm 38' has a circular recess 50 in its outer face, the peripheral surfaces of which are lined with phosphor bronze or other suitable bearing shims 51 and the plate is rotatably supported on a circular undercut boss 52 projecting inwardly from chuck plate 14' coaxially with chuck collet 12', a split ring 53 being fitted in the undercut groove 54 in boss 52 and secured to the plate 32' by screws 55, thus retaining the plate on the boss. Bearing shims 56 are also interposed between the ring and the sides of the groove, while a thin gasket 57 between the ring and plate seals this joint to exclude foreign matter. Consequently, the plate, arm and center point can be accurately rotated about the axis of the chuck and hence of the work during rotation of the main container 3'.

For effecting this rotation in coordination with that of the main container, I provide any suitable driving means such as a radially projecting stud 58 threaded into the edge of plate 32' and received between the arms of a forked actuating stud 59 projecting outwardly parallel to the axis of the main container from a ring 60 carried by the adjacent end face of the latter.

The chuck illustrated in Fig. 5 is mechanically substantially the same as that heretofore described and includes a tapered collet 12' engaging the work and adapted to be driven into a tapered hole in boss 52 on plate 14' by a driver 15' operated by lever 16'.

Chuck plate 14' is carried by ring 18', the latter having a packing ring 61 attached to its inner face adjacent split ring 53 to prevent passage of metal chips and other foreign matter between these parts to the bearing surfaces on which plate 32' turns, and another but thinner packing washer 62 is interposed between plate 32' and boss 52 adjacent the chuck bore for a generally similar purpose. Ring 61 is preferably made of heavy leather and is therefore relatively impermeable to oil and the like, but washer 62 may desirably be made of felt or some more permeable fibrous material.

It will thus be apparent that in the form of the invention last described it is unnecessary to make any provision for longitudinal movement of supporting arm 38' with respect to the center point to compensate for the longitudinal movement of the main container required when cutting threads, worms or the like since the arm is supported from the chuck and thus never moves axially with respect to the work. However the bearings on which plate 32' rotates must be initially accurately constructed and thereafter maintained in that condition to insure substantially absolute coincidence between the axis of the center point and that of the work as arm 38' rotates about the latter. On the other hand, the form of the invention first described is devoid of these bearings and packings but in it provision must be made to compensate for the longitudinal movement of the container when required by the nature of the work as the center point and its supporting arm are carried by the main container itself.

Moreover, while I have herein described certain embodiments of the invention with considerable particularity, it will be understood I do not desire or intend to limit or confine myself thereto or thereby in any way as changes and modifications in the form, structure and arrangement of the instrumentalities employed and in their mode of operation will readily occur to those skilled in the art and may be made if desired without departing from the spirit and scope of the invention as defined in the appended claims.

Having thus described my invention, I claim and desire to protect by Letters Patent of the United States:

1. In combination with a milling machine comprising a milling cutter, means for rotating the cutter on its axis and means for carrying the cutter in a circular orbit about a second axis, and work holding means axially offset in one direction from the plane of said orbit adapted to receive and stationarily support a work piece, an arm extending within said orbit from one side of said plane to the other, work supporting means carried by the arm adapted to engage the end of a work piece positioned in said holding means and means for moving the arm about the second axis in correspondence with the orbital movement of the cutter.

2. In combination with a milling machine comprising a milling cutter, means for rotating the cutter on its axis and means for carrying the cutter in a circular orbit about a second axis, and work holding means axially offset in one direction from the plane of said orbit adapted to receive and stationarily support a work piece, work supporting means normally disposed in angularly spaced relation to the point of initial engagement of the cutter with the work comprising a part lying in concentric relation with the orbital path of the cutter adapted to afford support to the free end of the work piece when held by the holding means and means for moving said supporting means about said second axis in correspondence with the orbital movement of the cutter to thereby maintain the said supporting means in said spaced relation to the point of engagement of the cutter with the work during its progress.

3. In combination with a milling machine comprising a milling cutter, means for rotating the cutter on its axis and means for carrying the cutter in a circular orbit about a second axis, and work holding means axially offset in one direction from the plane of said orbit adapted to receive and stationarily support a work piece, an arm extending adjacent the work, transversely of the plane of the cutter orbit, a work end support carried thereby adjacent one side of said plane comprising a work end engaging element disposed coaxially with the cutter orbit and movable along said second axis relatively to said arm, means yieldingly urging said element in one direction along said axis, means limiting said movement, and means supporting the arm from the other side of said plane operative to move it about said second axis in correspondence with the orbital movement of the cutter.

4. In combination with a milling machine comprising a milling cutter, means for rotating the cutter on its axis and means for carrying the cutter in a circular orbit about a second axis and work holding means axially offset in one direction from the plane of said orbit adapted to receive and stationarily support a work piece, a support disposed adjacent the holding means on one side of said plane, an arm extending from said support to the other side of said plane adjacent said second axis, means carried by the arm adapted to center the end of the work piece when held by said holding means and means for rotating the support about said second axis during orbital movement of the cutter.

5. In a work centering and supporting device for a milling machine comprising a rotatable cutter movable in a planetary path relatively to the axis of the work, an arm extending adjacent to the work axis within the orbit of the cutter teeth, means carried by the arm adapted for coaxial engagement with the work, means disposed on the opposite side of the plane of said orbit from said last mentioned means for supporting the arm and, means for moving the arm about the axis of the work in correspondence with movement of the cutter axis and in substantially constant circumferentially spaced relation to the zone of engagement of the cutter teeth with the work as said zone progresses peripherally about the work.

6. In a work centering and supporting device for a milling machine comprising a rotatable cutter movable in a planetary path relatively to the axis of the work, an arm extending adjacent to the work axis within the orbit of the cutter teeth, means carried by the arm adapted for coaxial engagement with the work, means disposed on the opposite side of the plane of said orbit from said last mentioned means for supporting the arm, means for moving the arm about the axis of the work in correspondence with movement of the cutter axis and in substantially constant circumferentially spaced relation to the zone of engagement of the cutter teeth with the work as said zone progresses peripherally about the work and means interposed between said work engaging means and the arm adapted to yieldingly oppose relative movement between said means and said arm parallel to the work axis.

7. In a milling machine of the character described, holding means for supporting a work piece adjacent the path of the milling machine cutter, an arm disposed adjacent said means, rotatable about the axis of the work, extending transversely of the plane of the cutter path and comprising a part substantially coaxial with said means disposed on one side of said plane and adapted for engagement by the end of the work piece, means disposed on the other side of said plane for supporting the arm and means driven from the milling machine for progressively moving the arm about said axis in correspondence with movement of the cutter relatively thereto.

8. In combination with a milling machine comprising a main container adapted for rotative and axial movement, a secondary container eccentrically journaled in the main container, a cutter spindle eccentrically journaled in the secondary container, a cutter carried thereby and movable in an orbital path by rotation of the main container and means adapted to hold a work piece in fixed position in substantial transverse alignment with the cutter, of means for centering and supporting that end of the work remote from the work holding means when held therein comprising an arm extending across the path traversed by the cutter when operating on the work, a centering element slidably seated in the arm, means biasing the element toward the work holding means and means interconnecting the arm with the main container for rotative and axial movement therewith.

9. In combination with a milling machine comprising a main container adapted for rotative and axial movement, a secondary container eccentrically journaled in the main container, a cutter spindle eccentrically journaled in the secondary container, a cutter carried thereby and movable in an orbital path by rotation of the main container and means adapted to hold a work piece in fixed position in substantial transverse alignment with the cutter, of an arm associated with the work holding means and extending adjacent the work when the latter is held therein and across the orbital path of the cutter, a centering element carried by the free end of the arm on the opposite side of said path from said holding means and means for carrying the arm about the work in correspondence with the rotative movements of the main container.

10. In combination with a milling machine comprising a milling cutter, means for rotating the cutter on its axis and means for carrying the cutter in a circular orbit about a second axis and work holding means axially offset in one direction from the plane of said orbit adapted to receive and stationarily support on one side of said plane a portion of a work piece extending thereinto, a support located between said work holding means and said plane, means carried by the support extending across said plane for supporting another portion of the work piece and means for moving said last mentioned means about said second axis during orbital movement of the cutter.

11. In combination with a milling machine comprising a milling cutter, means for rotating the cutter on its axis and means for carrying the cutter in a circular orbit about a second axis and work holding means axially offset in one direction from the plane of said orbit adapted to receive and stationarily support a work piece, a support located on one side of said plane, work centering means adapted to center the end of the work piece when another part thereof is gripped by the holding means, means extending across said plane interconnecting the work centering means with the support and means for rotating said interconnecting means about said second axis during orbital movement of the cutter.

HENRY J. LEISNER.